US006966736B2

(12) United States Patent
Wolf et al.

(10) Patent No.: US 6,966,736 B2
(45) Date of Patent: Nov. 22, 2005

(54) METHOD AND STRUCTURE FOR LOCKING NUT WITH DEFORMABLE MEMBER

(75) Inventors: Theodore L. Wolf, Concord, OH (US); Alan R. Wolf, Painesville Township, OH (US); Hubert F. Renau, Walton Hills, OH (US)

(73) Assignee: The Dyson Corporation, Painesville, OH (US)

( * ) Notice: Subject to any disclaimer, the term of this patent is extended or adjusted under 35 U.S.C. 154(b) by 11 days.

(21) Appl. No.: 10/090,283

(22) Filed: Mar. 4, 2002

(65) Prior Publication Data

US 2003/0165369 A1   Sep. 4, 2003

(51) Int. Cl.[7] .............................................. F16B 39/34
(52) U.S. Cl. ..................................................... 411/303
(58) Field of Search ......................... 411/301–304, 947

(56) References Cited

U.S. PATENT DOCUMENTS 2,378,610 A * 6/1945 Wesley ....................... 411/302
3,203,459 A * 8/1965 Coldren
3,316,952 A * 5/1967 Hollinger
3,433,108 A * 3/1969 Ondeck ...................... 81/124.6
3,938,571 A   2/1976 Heighberger
4,069,854 A   1/1978 Heighberger
5,890,857 A * 4/1999 Herrera

* cited by examiner

Primary Examiner—Flemming Saether
(74) Attorney, Agent, or Firm—Patrick J. Daugherty; Driggs, Lucas, Brubaker & Hogg Co., LPA

(57) ABSTRACT

A structure and method for a locking nut with a deformable member is provided. The locking nut has an elongated body relative to a comparable standard non-locking nut, allowing the nut to provide a standard length of thread for engaging bolt members while also defining a void for carrying the deformable locking member. The void has a forged side-wall structure that substantially engages the locking member within the void while shipping or handling the lock nut. The locking member deforms and flows into thread areas, thereby providing locking and vibration dampening functions, and also deforms or flows into the side-wall structures, thereby enabling the lock nut to impart sufficient frictional forces to the member to remove the deformed member from an assembly when the nut is removed. The locking forces imparted to the structure by the member may be varied and, therefore, increased by user-applied forces.

19 Claims, 3 Drawing Sheets

METHOD AND STRUCTURE FOR LOCKING NUT WITH DEFORMABLE MEMBER

BACKGROUND OF THE INVENTION

Fastening objects together through methods incorporating threaded nut and bolt structures is well known. Typically, a male-threaded bolt projection from a first item is passed through an aperture in a second item, and a threaded nut is rotated onto the bolt projection until the bolt tightly compels the second item against the first item to form an assembled structure. Problems arise in maintaining the integrity of the resultant structure, as well as the individual components. For example, operational vibrations from use of the resultant structure may become translated into rotational movement of the nut relative to the bolt that loosens the bolt. Using a deformable insert component to provide a locking effect upon the threads of the nut and bolt assembly is well known in the art. One example is U.S. Pat. No. 3,938,571 to Heighberger for a "Nut with Sealing Insert." Alternatively, rigid metallic locking devices have been used, which apply frictional locking forces upon the bolt member threads. An example of this type of device is U.S. Pat. No. 4,069,854 to Heighberger for "Locknut with Segmental Locking Elements."

However, the prior art methods and structures have structural and functional disadvantages. Significantly, in the prior art, nut thread area is lost in order to allow for insertion of the locking element. For example, a conventional two-inch thread-nut has two inches of total body length and thread length along its central axis C. The prior art two-inch bolt with locking component also has two inches of total body length, but formation of a mounting void for containing the locking component results in a corresponding reduction of thread length. This shortening of thread length results in a reduction in structural strength in the nut which, in turn, results in a higher rate of nut thread failure when compared to a nut with a conventional (and therefore longer) thread length. Although the reduction in strength is dependent upon other factors, such as type of assembly and nut materials, it has been found that, as a general rule, a 25% reduction in thread engagement length can result in a 25% reduction in performance strength of a nut.

Another disadvantage with structures and methods utilizing a rigid locking insert is that the rigid member distorts the bolt threads through compressive force. This distortion results in damage to the bolt, which cannot be reused, and, therefore, the assembly cannot be disassembled and reassembled. This type of assembly is only useful for a single use or permanent installation, and is not available for uses that may require disassembly and re-assembly.

A further disadvantage of the prior art locking members is that a structural retaining element must physically and firmly retain the member within a member-carrying void during shipping and transport of the lock nut; otherwise, the member may become separated and lost. Similarly, a retaining structure is also needed to hold the member in place within the member-carrying area of the lock nut while the nut is being rotated about a threaded bolt member, and importantly during removal of the nut from the bolt. Prior art nuts, such as the aforementioned Heighberger "Nut with Sealing Insert", utilized a machine-knurled edge to "grip" the member during transport, application and removal. However knurl patterns formed by machining techniques have limited knurl element height, width and depth dimensions and, consequently, limited member retaining capabilities. The member often becomes separated and may be lost during shipping. More importantly, the "gripping" abilities of the machine-knurled patterns are limited and insufficient to impart the frictional forces required to rotate and remove the deformed member from a bolt as the nut is rotated off of a bolt. Consequently, a user must find another mechanical means to engage and remove the deformed member from the bolt, resulting in greatly increased time for removal and disassembly.

Other prior art nuts utilize a cap member element, which is formed over a portion of the top surface of the locking member and holds the member within a carrying void, to retain the member during transport, removal and disassembly. An example of such a prior art nut is the ESNA® NU locknut. The ESNA cap member also exerts frictional forces upon the surface of the member to help compel it to rotate about a threaded bolt as the nut is rotated about the bolt. It is readily apparent that such a structure requires an additional sacrifice of effective thread length by consuming corresponding nut body material for the formation of the cap member. Also, the presence of this fixed and rigid cap structure makes replacement of an individual locking member impossible and, where the member has been degraded or failed, the entire nut must be discarded and replaced.

Additionally, it is the compressive interaction of the projections, member-carrying void and the bolt threads that causes the deformable ESNA member to impart locking characteristics to the ESNA lock nut. As a result, the deformable member cannot freely rotate about the bolt threads, but instead must deform as it travels about the bolt. This deformation results in a great deal of frictional force that must be overcome as the ESNA nut is threaded onto or off of the bolt. Similarly, the member must deform and becomes structurally altered immediately upon application of the nut onto a bolt.

Furthermore, the frictional force exerted upon the bolt threads by the ESNA-type locking member is limited to a constant value resulting from the compressive forces exerted upon the member through the cap/void wall/bolt thread interaction. This frictional force value reaches a maximum value once the bolt threads engage the entire thread-engaging inner surface of the deformable member. It is apparent that this value will not be increased by further tightening of the nut upon either the bolt or upon a workpiece disposed about the bolt, since this tightening will not increase the compressive forces imparted to the member by the cap/void wall/bolt thread interaction. Moreover, as the deformable member travels along the bolt threads, frictional abrasion from the bolt threads degrades the deformable member. Therefore, the maximum frictional force value imparted by the deformable member upon the bolt threads decreases every time the nut is tightened or loosened about a bolt member. Eventually, the member will be degraded beyond a point of meaningful frictional engagement with the bolt threads and, since the ESNA nut structure does not provide for replacement of the deformable member, the entire nut and member assembly must be discarded and replaced. Therefore, the prior art ESNA-type nut is not preferred for applications requiring a large travel distance along the bolt threads for application, nor for those applications requiring disassembly and re-assembly of the nut/bolt structure.

Another desired characteristic is a vibration dampening function. The other prior art nuts limit their vibration-dampening characteristics to absorbing vibrations between the thread bodies of the nut and bolt. This type of dampening may be insufficient in some applications, and additional vibration dampening devices may be required between nuts and workpieces in order to ensure that the prior art lock nuts remain in a fixed position when the assembly is subject to operational vibrations.

What is needed is a locking nut that has the thread engagement strength of a comparable standard non-locking nut. What is also needed is a locking member that does not distort and thereby damage the threads of the nut or bolt member. The nut must also retain the locking member during shipping and transport, and during rotation about a bolt and, more importantly, during removal of the nut from an assembly. What is also desired is a locking member that freely travels over bolt member threads until the member reaches a locking engagement point, thereby avoiding degradation of the member during assembly and disassembly. It is also desired that the lock nut provide vibration-dampening qualities beyond the thread engagement areas and including the nut-to-workpiece interface, in order to provide adequate locking and vibration dampening and resisting characteristics. And lastly, it is desired that the a user may vary the amount of locking force required to lock the locking nut in position, and thereby also vary the force imparted to the final assembly by the locking member.

SUMMARY OF THE INVENTION

A structure and method for a locking nut with a deformable member is provided. The locking nut has an elongated body relative to a comparable standard, non-locking nut. The elongated body allows the nut to provide a standard length of thread for engaging bolt members, while also defining a void for the receipt and retention of the deformable locking member. The member-carrying void has a forged gear-shaped sidewall structure that substantially engages the locking member within the void while shipping or handling the lock nut, and also causes the member to rotate with the nut as the nut is rotated onto a bolt member. Imparting rotational force to the lock nut when engaged in a nut-workpiece-bolt assembly may compel the locking member to deform and flow into thread areas, thereby providing locking and vibration dampening functions. The member may also deform or flow into the gear-shaped side-wall structures, thereby enabling the lock nut to impart sufficient frictional forces to the member to remove the deformed member from an assembly when the nut is removed. The member may also deform into a void between the workpiece and the nut and thereby provide a vibration-dampening interface between the nut and workpiece. The locking forces imparted to the structure by the member may be varied and, therefore, increased by user-applied forces.

DETAILED DESCRIPTION OF THE INVENTION

Figure 1:
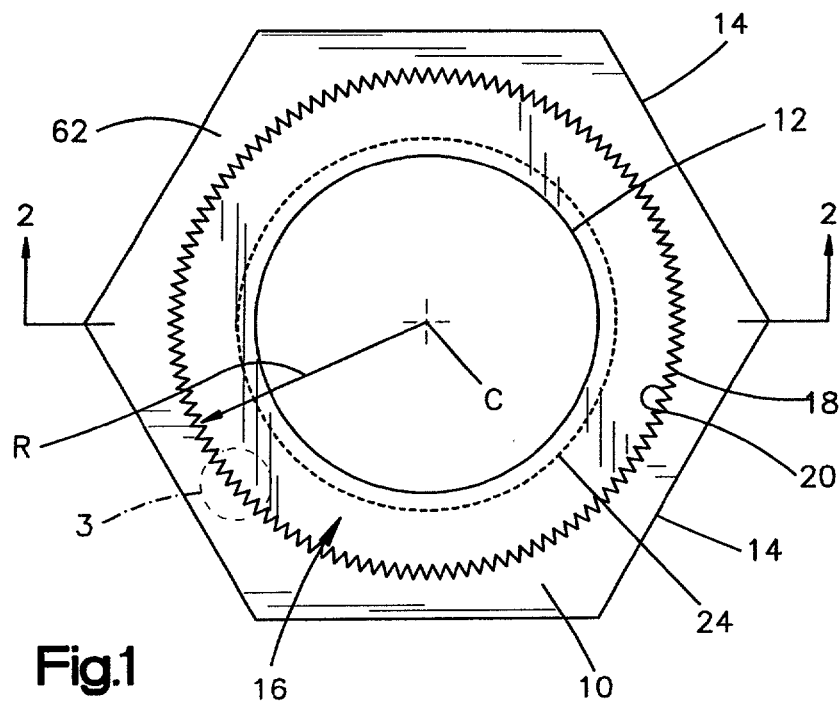
FIG. 1 is a top plan view of a lock nut according to the present invention.
Figure 2:
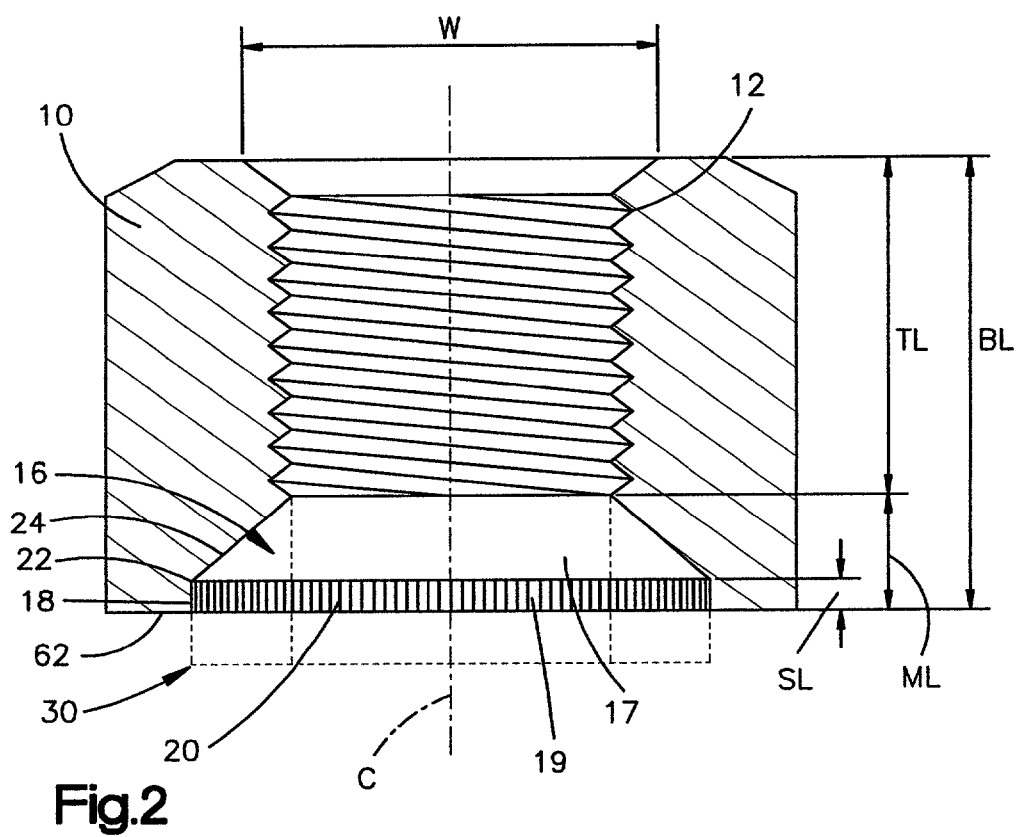
FIG. 2 is a side sectional view, taken about on the line 2—2 of FIG. 1, of the lock nut of FIG. 1 and incorporating a sectional view of an inserted locking member according to the present invention.

Referring to FIG. 1, a top-end view of an embodiment of a lock nut 10 with threads 12 according to the present invention is illustrated. FIG. 2 is a side sectional view, taken about on the line 2—2 of FIG. 1, of the lock nut of FIG. 1. As is conventional, the nut 10 has six exterior side-walls 14 for engagement with tools for rotational application about a mating threaded bolt workpiece (not shown), although it is readily apparent that other side-wall configurations are suitable, and the invention is not limited to lock-nuts with six exterior sidewalls. Between the exterior side-wall 14 and the threads 12, a locking member-carrying aperture 16 is defined. The aperture 16 is a locking member carrying region bounded by a splined circular interior sidewall element 18 and an actuating wall 24, and extending into space above the top surface 62 of the locknut 10. The splined side-wall 18 is defined by a series of vertical splines 20, each spline 20 preferably about parallel to a central axis C of the nut 10 and located along a radius R about the axis C, wherein the threads 12 and the actuating wall 24 are also defined radially about the same axis C. The actuating wall 24 is defined between the bottom ends 22 of the splines 20 and the threads 12.

Although the present embodiment of the spline 20 is parallel with the central axis, this alignment is not required and alternative alignments of the splines will be apparent to one skilled in the art. For example, the splines may taper inwardly (not shown) with respect to the central axis as one views the splines from the top surface. This configuration would enable easier insertion or removal of a deformable member from the locknut of the present invention. Alternatively, the splines may taper outwardly (not shown) with respect to the central axis as one views the splines from the top surface. This latter configuration would facilitate retention of a deformable member, compressed and flowed according to the present invention within the member-carrying aperture when the locknut is loosened and removed from a workpiece bolt.

Referring now to FIG. 2, a side sectional view of the nut 10 of FIG. 1 is provided, incorporating a sectional view of an inserted locking member 30 according to the present invention. Although, in the present embodiment, the aperture 16 has a conical portion 17 defined by the conical shape of the conical actuating wall 24 and a cylindrical splined aperture wall portion 19 defined by the parallel orientation of the splines 20 along the central axis C, other wall 18 and 20 shapes may be practiced by the present invention, and the invention is not limited to these specific shapes. For an example, an alternative actuating wall (not shown) may have a flat circular shape parallel to the radius R. Similarly, alternative splines (not shown) may have an orientation other than parallel to the central axis C, as described above. Accordingly, the embodiment of the invention described is exemplary of the invention, and the invention is not limited to the embodiment illustrated in the figures.

A conventional non-locking nut typically has a thread length roughly equivalent to the thread size. Accordingly, a two-inch thread-nut has two inches of thread length along its central axis. Prior art lock nuts (not shown) are typically formed from standard non-lock nuts by creating a locking insert void within the nut body, and the formation of the void necessarily results in a corresponding loss of thread length. This shortening of thread length results in a reduction in structural strength in the nut which, in turn, results in a higher rate of nut thread failure when compared to a non-locking nut with a conventional (and therefore longer) thread length. Although the reduction in strength is dependent upon other factors, such as type of assembly and nut materials, it has been found that, as a general rule, a 25% reduction in thread engagement length can result in a 25% reduction in performance strength of a nut.

Referring again to FIG. 2, one important advantage the present invention is that the total thread length TL is about equivalent to the thread size W. This is accomplished by forming the locknut 10 from a nut body with a greater body length than a conventional prior art locknut or non-locking nut. Aperture 16 is formed within a portion of the locknut 10 having an aperture length dimension IL, which results in an overall locknut length BL that is the sum of the thread length TL dimension and the aperture length dimension IL. Accordingly, the locknut 10 has about the same thread strength as a convention non-lock nut, and greater thread strength than prior art lock nuts, which have a diminished thread length dimension.

Figure 3:
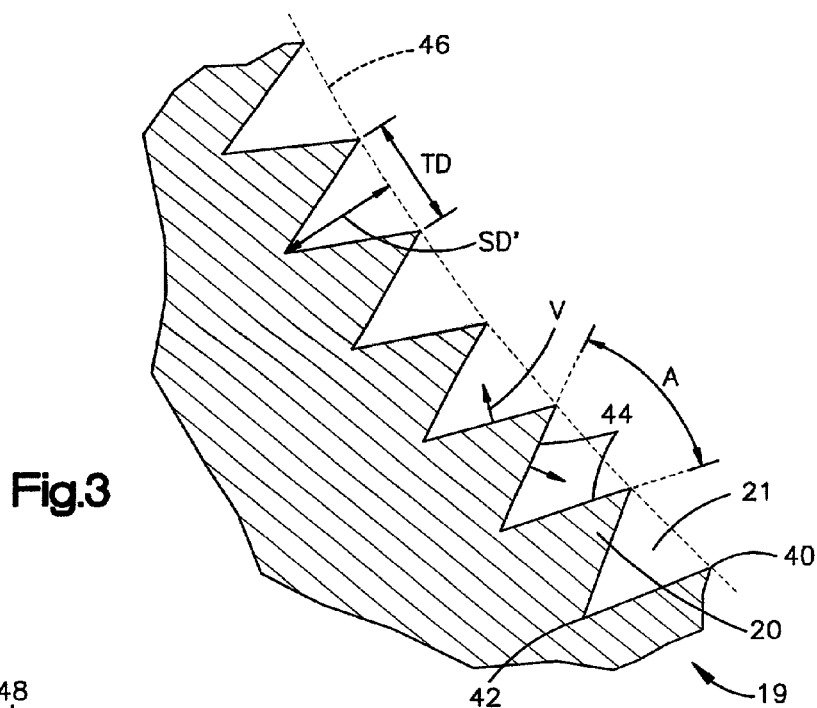
FIG. 3 is a top fragmentary detail plan view of the lock nut of FIG. 1 illustrating spline elements according to the present invention.

As illustrated in FIG. 2, the splines 20 have a length dimension SL. Referring now to FIG. 3, a partial view of the splined aperture wall 19 is provided. The splines 20 shown in FIG. 3 have a preferred gear shape and array structure, although other shapes and array structure may be practiced with the present invention. The geared splines 20 have a depth dimension SD between each spline tip 40 and spline base 42. The splines 20 also define an angle A between adjacent spline walls 44, and further define spline voids 21 between adjacent spline walls 44. The preferred depth dimension SD and angle A dimensions will vary depending upon the size of the locknut 10, the application of the locknut 10 and the type of deformable locking member 30 utilized with the locknut 10.

Although the spline 20 embodiment described thus is of a pointed triangular shape with uniform dimensions SD and SL and wall angles A, and is distributed uniformly around the entire circumference of the splined aperture wall 19, the invention is not limited to this configuration. For example, some applications of the invention may not require that the entire circumference of the splined aperture wall 19 be comprised of splines. Instead, a limited distribution of splines may be spaced about smooth aperture wall portions (not shown). Alternatively, splines may be grouped in discrete clusters (not shown) separated by smooth aperture wall portions. The exact number of splines 20 or distribution of splines 20 is not important to the invention. What is important is that a sufficient number of splines 20 are provided, and that the splines 20 have sufficient depth dimensions SD and length dimensions SL to ensure that the deformable locking member 30 is fly engaged by the splines 20.

A preferred embodiment of the deformable member 30 is formed from a resilient plastic material, such as a polypropylene or a polytetrafluoroethylene, which have excellent qualities of elastic memory and are well suited for low-temperature applications. Polypropylene has a high melting point, low density, excellent environmental stress crack resistance and chemical resistance, and provides a good barrier to moisture, grease or oil. It is preferred for application operating temperatures below 225 degrees Fahrenheit (° F.). For higher temperatures, up to 500° F., a polytetrafluoroethylene material, such as Teflon®, is preferred.

Alternatively, where the nut applications may be subject to high temperatures above 500° F., the deformable member 30 may be formed from a soft metal, such as a copper or aluminum metallic compound. For example, where operating temperatures may rise above 500° F., polytetrafluoroethylene would liquefy and, therefore, would not be suitable. A copper or aluminum compound, however, may be soft enough to deform and provide the vibration and locking characteristics described above, and yet maintain solid characteristics at high temperatures.

It is important that the splines 20 firmly engage the deformable member 30 and thereby hold the member 30 within the member-carrying aperture 16 during shipping and during application of the locknut 10 to a bolt and workpiece. The tips 40 of the present embodiment are pointed, and define a tip array diameter 46 about the central axis C which is less than that of the outer deformable member diameter 48. The member 30 is pressed into the aperture 16, causing the tips 40 to impinge into the outer surface 50 of the member 30. It is important that the member 30 has an inherent resilience that causes the outer surface 50 to impart reactive expansion forces against the impinging tips 40. The interaction of the tips 40 and the outer surface 50 results in frictional forces that retain the member 30 within the aperture 16 while the nut 10 is being shipped, transported or otherwise handled.

Figure 4:
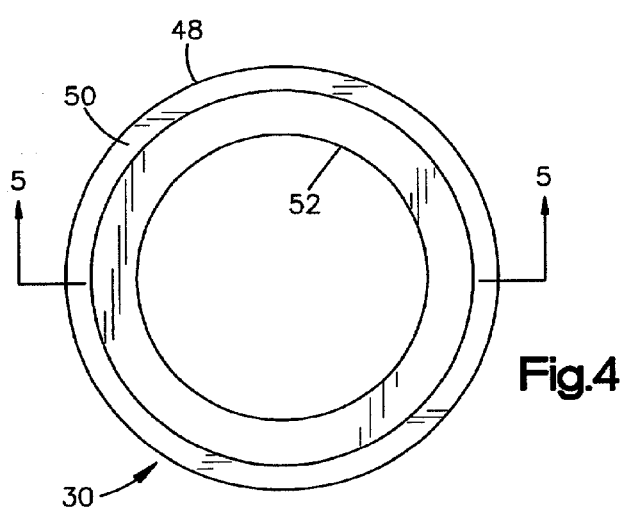
FIG. 4 is a top plan view of a locking member according to the present invention.
Figure 5:
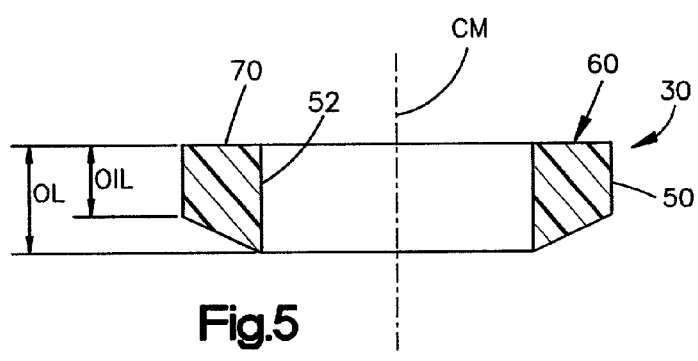
FIG. 5 is a sectional view, taken about on the line 4—4 of FIG. 4, of the member of FIG. 3.
Figure 6:
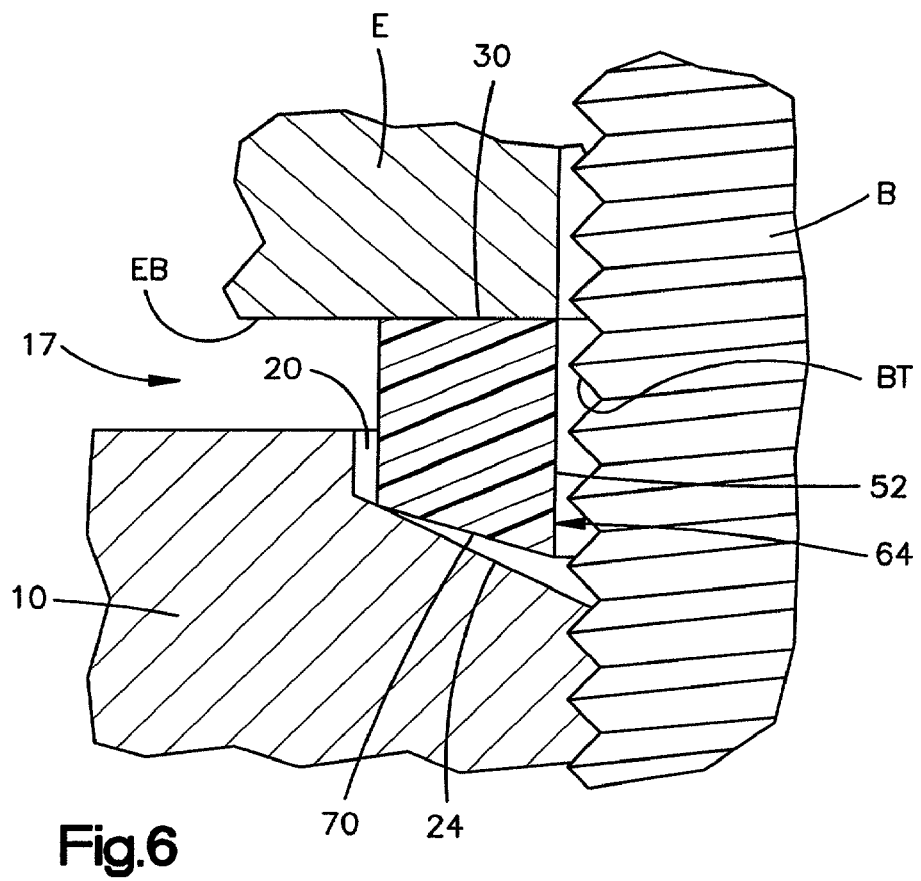
FIG. 6 is an enlarged side sectional fragmentary view of an assembly of a locknut and locking member according to the present invention, a workpiece threaded bolt and an engagement workpiece.

Referring now to FIGS. 4 and 5, the inner surface 52 of the deformable member 30 is of a cylindrical shape, shaped about a central axis CM common to the cylindrical outer surface 50. It is preferred that the member axis CM is aligned with the nut central axis C when the member 30 is inserted into the aperture 16. FIG. 6 illustrates an assembly of the locknut 10, the locking member 30, a workpiece threaded bolt B and an engagement workpiece E. It is also preferred that the inner surface 52 have a diameter greater than the thread size W of the locknut 10, thereby creating a space 64 between the inner surface 52 and the workpiece bolt threads BT. Therefore, when the locknut 10 and inserted deformable member 30 are rotated about the bolt B, the deformable member 30 will not engage the bolt threads BT. Moreover, the member 30 will pass over the bolt threads BT without frictional interaction or rotative restraint imparted to the member 30 and locknut 10 assembly by engagement of the deformable member 30 with the bolt threads BT. This is important in preventing degradation or wear effects upon the member inner surface 52 by application or removal of the member 30 and locknut 10 assembly to or from the bolt B.

Figure 7:
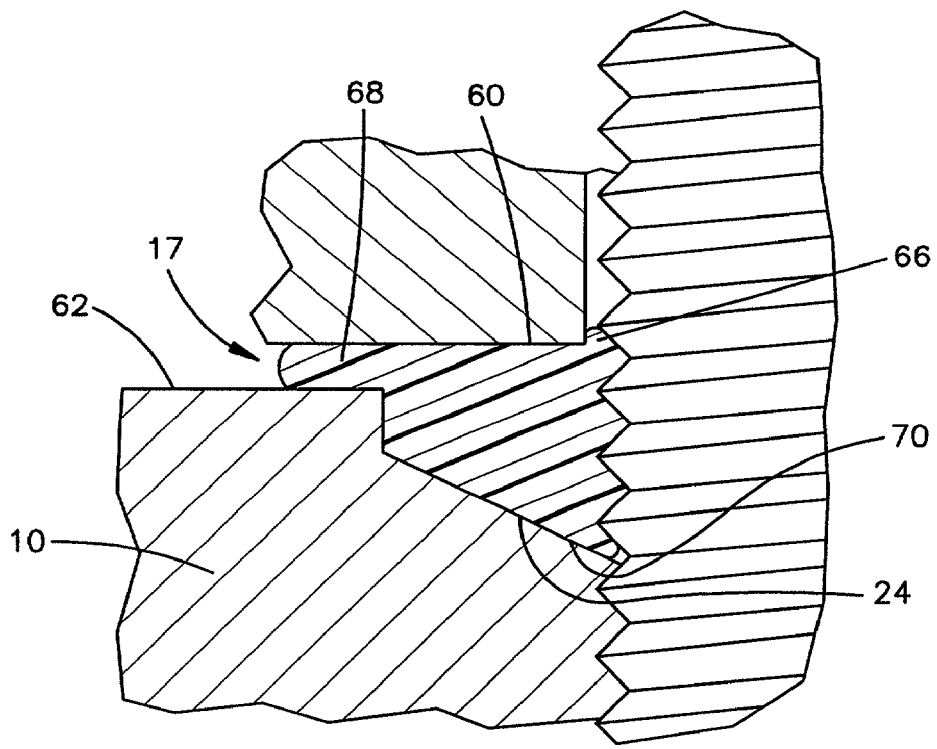
FIG. 7 is another view of the assembly of FIG. 6.

FIG. 7 shows the assembly of FIG. 6, wherein the locknut 10 has been tightened about the bolt B sufficient to cause the deformable member upper surface 60 to engage the workpiece bottom surface EB, and the deformable member bottom surface 70 to engage the actuating wall 24. As the locknut 10 is further tightened about the bolt B, the member 30 is compressed by the actuating wall 24 and the engagement workpiece bottom surface EB, causing the member 30 to deform and cold-flow into spaces 64, the bolt threads BT, the spline voids 21, and into the interface region 17 defined between the workpiece engagement bottom surface EB and the locknut 10 upper surface 62.

The compressed and cold-flowed member 30 thereby forms thread-engaging regions 66. The thread-engaging regions 66 impart a resilient expansion force against the bolt threads BT and a corresponding frictional force that resists movement of the bolt threads BT relative to the member 30. The same resilient expansion forces are imparted by the compressed and deformed member 30 against the locknut 10 actuating wall 24, the splines 20, and the locknut threads 12, and therefore the same corresponding frictional force that resists movement of the locknut 10 relative to the member 30. Additionally, referring again to FIG. 3, the spline walls 44 exert normal force vectors V against portions of the deformable member 30 flowed into the spline voids 21 responsive to rotation forces exerted upon the deformable member 30 relative to the locknut 10. Accordingly, the deformed and flowed member 30 provides locking forces that "lock" the locknut 10 into place relative to the bolt B and workpiece E.

Moreover, a resilient plastic material with elastic memory is particularly preferable in order for the deformable member 30 to relax slightly when the nut 10 is loosened. By relaxing, the frictional forces imparted by the deformable member 30 against the bolt threads BT are reduced sufficiently to allow the member 30 to move relative to the bolt threads BT as the locknut 10 is loosened about the bolt B. Although the frictional forces exerted against the bolt threads BT by the member 30 are reduced, the portions of the member 30 that flowed into the spline voids 21 are still firmly engaged by the spline walls 44 and, accordingly, the member 30 is compelled by the splines 20 to rotate with the locknut 10 as the locknut 10 is loosened about the bolt B. The greater the elastic memory and resiliency of the deformable member 30, the greater the ability of the deformable member 16 to be reused in further applications. One embodiment of a plastic deformable member according to the present invention comprises polypropylene. Other embodiments are comprised of Teflon. Other suitable plastic materials will be readily apparent to one skilled in the art.

As shown in FIG. 7, it is preferred that a sealing and insulating portion 68 of the member 30 flows into the interface region 17. This insulating portion 68 thereby serves as a sealing and vibration-dampening interface between the locknut 10 and workpiece E. The preferred thickness of the insulating portion 68 sufficient to provide insulating and/or sealing characteristics will depend upon the size of the locknut 10 and the desired application. For example, for a two-inch locknut 10 with a polypropylene locking member 30, an insulating portion 68 having a thickness of about one-sixteenth inch has been found to provide good vibration dampening characteristics. However, a greater insulating portion 68 thickness may be desired for applications subject to greater vibration forces, and the one-sixteenth inch thickness is only illustrative of one possible embodiment. If desired, the nut upper surface 62 may be knurled or splined (not shown), in order to provide additional locking characteristics resultant from increasing frictional resistance to rotational movement of the insulating portion 68 relative to the locknut 10.

In practicing the invention, the locknut 10 is tightened against the workpiece E sufficient to flow the member 30 into bolt thread regions 64, and into the interface region 17 to form the insulating portion 68. The resiliency of the member 30 exerts expansion forces against the constraining and deforming elements: the bolt threads BT, workpiece engagement bottom surface EB, the locknut upper surface 62, actuating wall 24 and splined side-wall 18. The locking characteristics of the deformable member 30 are proportionate to the expansion forces exerted by the member 30 against these restraining elements. The expansion forces exerted by the deformed member 30 may be increased by further tightening the locknut 10 about the bolt B, which increases the compressive forces acting upon the member 30 by the constraining and deforming elements and, therefore, the reactive expansion forces by the member 30. Some of this force will be translated into additional member 30 material flowing into the interface region 17. But the interaction of the cold-flow fluid dynamics of the member 30 and the decreasing size of the interface region 17 will limit the amount of force dissipated by material flow of the member 30 into the interface region 17. Accordingly, a portion of the increased compressive forces acting upon the member 30 will be translated into additional expansion forces exerted by the member against the constraining elements. In this manner, the locking forces imparted to the structure by the deformable member may be varied and increased, an improvement over the prior art ESNA® type of locknut.

In order to ensure that sufficient material will cold-flow into the thread regions 64 and interface region 17, it is necessary that the locking member 30 have a dimensional volume size larger than the volume of the member-carrying aperture 16. The excess material volume will provide the material deforming and flowing into the thread regions and interface region 17. Accordingly, the preferred dimensional size of the deformable member 30 relative to the aperture will depend upon the size of the locknut 10, the size of the bolt thread region engaged by the deformed material, and the desired size of the interface region 17 (if any).

Another important feature of the present invention is that the locking member 30 rotates and remains engaged with the locknut 10 when the locknut 10 is loosened and removed from the bolt B. This enables the rapid removal of the member 30 with the locknut 10 and, accordingly, rapid disassembly of the member 30 and locknut 10 from the workpiece assembly. In contrast, prior art deformable locking inserts typically remain engaged and secured about the bolt and workpiece interface when the prior art locknut is removed.

As discussed in the background of the invention material, prior art nuts, such as the aforementioned Heighberger "Nut with Sealing Insert", utilize a machine-knurled edge to "grip" the member during transport, application and removal. However knurl patterns formed by machining techniques have limited maximum knurl element height, width and depth dimensions, due to the problems inherent in machining patterns within the relatively small member-carrying voids. Only a relatively small portion of the knurling tool can fit within the void and, accordingly, only small-dimensioned knurls can be formed without damaging the prior art locknut. Most importantly, a knurl applied through a machining means has a limited depth within an insert carrying void, limiting the prior art knurl pattern to only that portion of the insert carrying void near the surface of the void. Consequently, the "gripping" abilities of a machine-knurled pattern is limited and insufficient to impart the frictional forces required to rotate and remove the deformed member from a bolt as the nut is rotated off of a bolt.

What is new in the present invention is forming of substantial member-engaging elements by a forging process. The present invention can be practiced with either hot or cold forging techniques. What is important is that member-engaging elements of a substantial depth and height are formed, so that the deformable locking member cold-flows about the member-engaging elements and engages them substantially. Therefore, when a locknut according to the present invention is removed from a bolt and/or workpiece, the deformable member remains substantially engaged by the locknut and is removed along with it.

Referring again to FIG. 2, an embodiment of a deformable member-engaging element is illustrated, the gear shaped splines 20. The spines 20 have a substantial height SL. The height SL is determined by the size of the locknut 10 and the size of the deformable insert 30. For a two-inch locknut according to the present invention, an exemplary height SL is about three-sixteenth of an inch. For a half-inch locknut, a spline height SL of about one-sixteenth of an inch is preferred. The splines 20 define the circular interior sidewall element 18 and, accordingly, it is preferred that the height of the circular interior sidewall element 18 is about the same as the spline height SL.

Prior art knurl patterns are generally of a shallow surface depth, due to the limitations of machining technology. The forged gear-shaped splines 20, according to the present invention shown in FIG. 3, have substantial triangular shaped spline voids 21 defined by substantial spline depth SD and tip-to-tip TD dimensions. The spline tips 40 are preferably of a pointed form. This pointed tip form enables the splines 20 to pierce into the outer deformable member surface 50 when the member 30 is pressed into the aperture 16, since the tip array diameter 46 is less than that of the outer deformable member diameter 48, as discussed earlier. The pointed tips 40 also pierce into the member 30 when the member is compressed against the splines 20 as the locknut 10 is tightened against the bolt B and workpiece E, thereby urging the cold-flowing of the member 30 into the voids 21. The triangular shape of the voids 21 imparted by the straight and smooth linear planar shape of the spline sidewalls 44 enables the member 30 to deform and fill virtually the entire void 21. This ensures that enough of the deformable member 30 flows into the voids 21 so that the member 30 is firmly engaged by the locknut 10 as the locknut 10 is loosened and removed from the bolt B and workpiece E. The pitch, angle A and spline height SL values enabled by the forging process according to the present invention are substantially greater than those attainable by prior art knurling processes. It is preferable that the angle A has a value selected from the range of about 60 degrees to about 120 degrees, and that the pitch of the spline tips 40 per inch is a value selected from the range of about 10 to about 24. A preferred exemplary two-inch locknut according to the present invention has an angle A value of about ninety degrees, and a spline tip 40 pitch of about 14. However, preferred values will change based upon the size of the locknut; for example, for locknuts larger than two-and-one-half inches, a preferred pitch for a plastic deformable insert is about 10. For locknuts below one-inch in thread diameter, it is preferred that cold-forging processes are used to form the splines. For locknuts above one-inch in thread diameter, it is preferred that hot-forging processes are used.

It is also well known in the arts that structures formed by forging have a superior integrity to those structures formed by machining. The act of machining a knurl pattern creates knurl structures by substantially removing material from the nut body through cutting forces. In contrast, forming the splines 20 through a forging process results in material being compressed into the desired shape by a stamping action. This results in an increased material density in the forged spline and actuating wall areas, resulting in a corresponding increased structural integrity of the spines 20 as compared to prior art knurl structures.

While preferred embodiments of the invention have been described herein, variations in the design may be made, and such variations may be apparent to those skilled in the art of making tools, as well as to those skilled in other arts. The materials identified above are by no means the only materials suitable for the manufacture of the tool, and substitute materials will be readily apparent to one skilled in the art. The scope of the invention, therefore, is only to be limited by the following claims.

What is claimed is:

1. A locknut with a deformable member, comprising:
   (a) a metal threaded nut body with a central axis and atop end having a top surface;
   (b) the threaded nut body having a plurality of internal threads defined along a first radius from the central axis, the plurality of threads defining a threaded body length dimension along the central axis having a top end, the plurality of threads further having a common thread diameter having a radius dimension;
   (c) an aperture forged at the nut body top end about the central axis and having a first volume dimension, the aperture defined by a plurality of forged generally triangular splines disposed in a circular array about the central axis from the top surface to a forged actuating wall;
   (d) each of the plurality of splines further having first and second forged planar sidewalls meeting to form a forge pointed linear engagement edge, the first and second sidewalls and edges extending from the top surface to the actuating wall and parallel to the central axis, the engagement edges arrayed along an edge radius about the central axis and larger than the first thread diameter radius;
   (e) a plurality of generally triangular spline voids each defined between the first and second sidewalls of adjacent spines having a V-shaped groove along the length of the sidewalls parallel to the central axis;
   (f) the first and second sidewall defining an angle with a value of from about 60 to about 120 degrees;
   (g) the engagement edges arrayed with a pitch value per inch of between 10 to 24; and
   (h) a deformable locking member having a second volume dimension larger than the aperture first volume and inserted within said aperture and having an outer surface engaged by the engagement edges, a top workpiece engagement surface, a cylindrical inner surface and a bottom actuating surface, wherein the outer surface is disposed on an outer surface radius about the central axis and larger than the edge radius;
   wherein the deformable member is configured to deform and substantially flow into the spline voids and into the threads of a workpiece bolt when the member is tightened onto a workpiece bolt until the member top surface is compressively engaged by a workpiece surface and the member bottom actuating surface is compressively engaged by the aperture actuating wall, the member thereby exerting expansion locking forces against the workpiece bolt threads; and
   wherein the deformable member is configured to remain engaged by the spline sidewall and edges and rotate with the locknut when the locknut is loosened about the workpiece bolt.

2. The locknut of claim 1 wherein the deformable member is formed from a material selected from the group consisting of polypropylene, polytetrafluoroethylene, and a copper metallic compound.

3. The locknut of claim 2 wherein the expansion locking forces exerted against the workpiece bolt threads by the deformable member may be increased or decreased by tightening or loosening the locknut about the workpiece bolt.

4. The locknut of claim 1 wherein the member further deforms and flows into an interface region between the locknut top surface and a workpiece surface, the member thereby forming a vibration absorbing member between the locknut and the workpiece.

5. The locknut of claim 1 wherein the member further deforms and flows into an interface region between the locknut top surface and a workpiece surface, the member thereby forming a sealing member between the locknut and the workpiece.

6. The locknut of claim 1 wherein the deformable member cylindrical inner surface has an inner surface radius greater than the thread radius.

7. The locknut of claim 1 wherein the linear spline engagement edges have an edge length of about one-sixteenth of an inch, and the threaded body length is about one-half inch.

8. The locknut of claim 1 wherein the linear spline engagement edges have an edge length of about three-sixteenth of an inch;
the threaded body length is about two inches;
the spline void sidewall angle is about 90 degrees; and
the pitch value is about 14.

9. The locknut of claim 1 wherein the threaded body length dimension is about equal to the thread diameter.

10. A method for locking a nut onto a bolt, comprising the steps of:
(a) providing a metal nut body, the nut body having a central axis and top and bottom ends and a top surface;
(b) forging a plurality of generally triangular forged splines on a circular array about the central axis and forged actuating wall through a portion of the top surface on the nut body top end, each of the plurality of splines having first and second forged planar sidewalls meeting to form a forged linear engagement edge, the engagement edges arrayed along an edge radius about the central axis, the first and second planar sidewalls and pointed linear engagement edges oriented parallel to the central axis and extending from the top surface to the actuating wall, the circular array of splines and the actuating wall defining an aperture about the central axis having a first volume dimension;
(c) the splines further defining a plurality of generally triangular spline voids between the first and second sidewalls of adjacent splines having a V-shaped groove along the length of the sidewalls parallel to the central axis;
(d) the first and second sidewalls defining an angle with a value of from about 60 to about 120 degrees;
(e) the engagement edges arrayed with a pitch value per inch of between 10 to 24;
(f) internally threading the nut body with a plurality of internal threads from the actuating wall to the nut body bottom end, the threads having a common thread diameter having a radius dimension defined from the central axis and smaller than the edge radius, the threads further defining a treaded body length dimension along the central axis from the actuating wall end to the nut body bottom end;
(g) forming a resilient deformable locking member having a top workpiece engagement surface, a cylindrical inner surface having an inner radius, a deformable outer surface defined on an outer radius larger than the spline edge radius, and a bottom actuating surface, and further having a second volume dimension larger than the aperture first volume dimension;
(h) inserting the resilient deformable locking member into the aperture and thereby the member outer surface into compressive contact with the spline engagement edges, the deformable member;
(i) threading the nut body onto a bolt having a corresponding thread diameter;
(j) rotating the nut body about the bolt and thereby causing the nut body to travel along the bolt until the deformable member top workpiece engagement surface engages a workpiece surface;
(k) further rotating the nut body about the bolt, the deformable member thereby compressively engaging the spline engagement edges, the actuating wall, the workpiece surface and the bolt threads;
(l) deforming and cold-flowing the deformable member inner surface into and about the bolt threads and the deformable outer surface about the spline walls and into the spline voids responsive to said compressive engagement; and
(m) the cold-flowed deformable member exerting expansion forces against said spine engagement edges, actuating wall, workpiece surface bolt threads and spine walls, thereby providing frictional locking forces locking the nut body into a fixed position relative to the bolt;
wherein the deformable member is configured to substantially flow into the spline voids sufficient to cause the cold-flowed member to remain engaged by the spline voids and rotate with the nut body when the nut body is loosened about the bolt.

11. The method of claim 10 wherein the step of forming the resilient deformable locking member further comprises the step of selecting a material from the group consisting of polypropylene, polytetrafluoroethylene, and a copper metallic compound.

12. The method of claim 11 further comprising the step of increasing the cold-flowed member expansion forces exerted against the bolt threads by further tightening the nut about the bolt.

13. The method of claim 10 further comprising the step of decreasing the cold-flowed member expansion forces exerted against the bolt threads by loosening the nut about the bolt.

14. The method of claim 10 wherein the step of further deforming and cold-flowing the deformable member outer surface further comprises the step of flowing a portion of the deformable member into an interface region between the nut top surface and a workpiece surface, the member thereby forming a vibration absorbing member between the locknut and the workpiece.

15. The method of claim 10 wherein the step of further deforming and cold-flowing the deformable member outer surface further comprises the step of flowing a portion of the deformable member into an interface region between the nut top surface and a workpiece surface, the member thereby forming a sealing member between the locknut and the workpiece.

16. The method of claim 10 wherein the deformable member cylindrical inner surface radius is greater than the thread radius.

17. The method of claim 10 wherein the linear spline engagement edges have an edge length of about one-sixteenth of an inch, and the threaded body length is about one-half inch.

18. The method of claim 10 wherein the linear spline engagement edges have an edge length of about three-sixteenth of an inch;
the threaded body length is about two inches;
the spline void sidewall angle is about 90 degrees; and
the pitch value is about 14.

19. The method of claim 10 wherein the threaded body length dimension is about equal to the thread diameter.

* * * * *